United States Patent [19]

Kristol et al.

[11] Patent Number: 5,541,927
[45] Date of Patent: Jul. 30, 1996

[54] METHOD OF MULTICASTING

[75] Inventors: David M. Kristol, Summit; Sanjoy Paul, Atlantic Highlands; Krishan K. Sabnani, Westfield, all of N.J.

[73] Assignee: AT&T Corp., Murray Hill, N.J.

[21] Appl. No.: 295,333

[22] Filed: Aug. 24, 1994

[51] Int. Cl.$^6$ .............................. H04L 12/56; H04L 12/44
[52] U.S. Cl. ........................... 370/94.2; 370/94.3; 371/32
[58] Field of Search ................................. 370/94.1, 94.3, 370/85.13, 85.14, 54, 60, 60.1, 94.2; 371/32, 33

[56] References Cited

U.S. PATENT DOCUMENTS

| | | | |
|---|---|---|---|
| 4,807,224 | 2/1989 | Naron et al. | 371/32 |
| 5,036,518 | 7/1991 | Tseung | 371/32 |
| 5,255,268 | 10/1993 | Cato et al. | 370/94.1 |
| 5,297,143 | 3/1994 | Fridrich et al. | 370/85.3 |
| 5,309,433 | 5/1994 | Cidon et al. | 370/94.1 |
| 5,355,371 | 10/1994 | Auerbach et al. | 370/94.3 |

OTHER PUBLICATIONS

L. Zhang et al., "RSVP: A New Resource ReSerVation Protocol," *IEEE Network*, Aug. 8–18 (Sep. 1993).

A. N. Netravali et al., "Design and Implementation of a High–Speed Transport Protocol," *IEEE Transactions on Communications*, vol. 38, No. 11, 2010–2024 (Nov. 1990).

L. Aguilar, "Datagram Routing for Internet Multicasting," *ACM Computer Communications Review*, vol. 14, No. 2, 57–62 (1984).

R. Aiello et al., "Design of a Reliable Multicast Protocol," *IEEE Infocom'93*, 75–81 (1993).

S. E. Deering, "Multicast Routing in Internetworks and Extended LANs," *ACM Computer Communications Review*, vol. 18, No. 4, 63–72 (1988).

S. Armstrong et al., "Multicast Transport Protocol," Network Working Group, Request for Comments: 1302 (Feb. 1992).

C. Partridge et al., "An Implementation of the Revised Internet Stream Protocol (ST–2)," *Internetworking:Research and Experience*, vol. 3, 27–54 (1992).

*Primary Examiner*—Douglas W. Olms
*Assistant Examiner*—Min Jung
*Attorney, Agent, or Firm*—Katharyn E. Olson

[57] ABSTRACT

A method of network multicasting using transport layer protocols, suitable for use in ATM networks, is disclosed. The protocols advantageously combine the acknowledgments of individual destinations along the underlying multicast tree to prevent acknowledgement implosion. The inventive method also prevents unnecessary retransmission by performing local multicasts.

13 Claims, 4 Drawing Sheets

METHOD OF MULTICASTING

TECHNICAL FIELD

The invention relates to multicast protocols for networks.

BACKGROUND OF THE INVENTION

A computer network is a means of exchanging or transferring information (e.g. data, voice, text, video, etc.) between host machines in the network. The network comprises host machines connected by a communication subnet. The subnet comprises nodes (also called switching elements) connected, to each other and to the hosts, by links. The information, often conveniently formatted into packets or cells, is transferred between a source host (also called a "source") and one or more receiving hosts (also called "destinations" or "endpoints") on a path by selecting a set of links and nodes in the communication subnet to form the path. See, Andrew S. Tanenbaum, *Computer Networks*, Prentice-Hall, Inc., Englewood Cliffs, N.J., 1981.

There are three types of designs for the communication subnet: 1) point-to-point subnets, 2) broadcast subnets and 3) multicast subnets. In a point-to-point subnet, if two hosts wish to communicate, but do not have a single link directly connecting them, then the hosts must communicate indirectly, i.e. via intermediate nodes. Typically, a communication is received in its entirety at each intermediate node, stored in buffers in the node until the next required link in the path is free, and then forwarded. In a broadcast subnet, information sent by any host is received by all other hosts. The information typically contains an address specifying the host for which the information is intended. Upon receiving the information, each host checks the address, and if the information is intended for that host, it is processed; otherwise the information is ignored. In a multicast subnet, a communication is received by a subset of hosts in the network. Multicasting may be point-to-multipoint (where a single host transmits to a plurality of hosts, e.g. electronic distribution of books from a publisher to bookstores across the nation) or multipoint-to-multipoint (where a subset of hosts in a network transmits information among the hosts in the subset, e.g. nationwide video conferencing).

A multicast protocol is a set of rules for conveying information from a single host to multiple hosts in a network or for conveying information among a subset of hosts. Although multicast protocols have been designed for unreliable broadcast network and satellite broadcast channels, (see, J. M. Chang and N. F. Maxemchuk, "Reliable Broadcast Protocols," *ACM Trans. Comp. Sys.*, Vol. 2, No. 3, 251–273, August 1984; K. Sabnani and M. Schwartz, "Multidestination Protocols for Satellite Broadcast Channels," *IEEE Trans. Comm.*, Vol. COM-33, No. 3, March 1985) the design of multicast protocols in general, and of multicast protocols for wide area, broadband, high speed networks in particular, presents special challenges. First, since each host must acknowledge information received, the protocol must overcome the acknowledgement implosion problem (i.e. the receipt at the source host of multiple acknowledgment signals) inherent in any multicasting scheme. Second, propagation delays (due to the physical area served by the network and the finite speed of signals transmitted over the network) combined with high transmission rates (due to a desire to transmit as much information as possible in the shortest time possible) produce large delay-bandwidth products.

Large delay-bandwidth products tend to increase the need to retransmit (i.e. remulticast) information. This is because: 1) at any given time a large amount of information is on the network (due to the large network bandwidth), and this large amount of information must be remulticast when information is lost—e.g. due to overflowing buffers in nodes in the network, and 2) feedback or acknowledgment signals from receiving hosts take a non-zero amount of time to reach the source host (due to propagation delays) thereby causing the source host to retransmit due to an absence of, or delay in, acknowledgments.

It is desirable that a multicasting source avoid unnecessary remulticasts since this will further increase the end-to-end delay of the protocol and increase traffic on the network. Hence, there is a need for a multicast protocol for broadband networks that can avoid unnecessary retransmissions of information and avoid the acknowledgment implosion problem while advantageously providing high throughput and low delay in information transmission.

SUMMARY OF THE INVENTION

The aforementioned problems are solved, in accordance with the invention, by a method of network multicasting in which a multicast tree from a source host to a set of destination hosts is utilized. The inventive method delivers information from the source host to the destination hosts in sequence along the multicast tree, independent of how the tree is created and of how resources are allocated.

In particular, the present invention is a method of transmitting blocks of information from a source to a set of destinations, where each destination is assigned to a local exchange in a set of local exchanges, receiving at the source a respective first status signal from each local exchange which indicates a reception status for that local exchange relative to the transmitted blocks, and transmitting in response to the first status signals, those blocks not received by any one of the local exchanges.

The inventive method reduces the acknowledgement implosion problem by limiting or consolidating status and acknowledgment information from the destinations. The inventive method also reduces unnecessary transmissions of information throughout the network by retransmitting information along local multicast trees. The protocol may be implemented in various types of networks. For example, the protocols may take advantage of improved resource allocation techniques in datagram networks or may take advantage of any efficient technique for setting up virtual circuits in connection-oriented networks.

BRIEF DESCRIPTION OF THE DRAWINGS

Advantages of the invention will become apparent from the following detailed description taken together with the drawings in which.

DETAILED DESCRIPTION

A. Overview of Multicast Protocols

Figure 1:
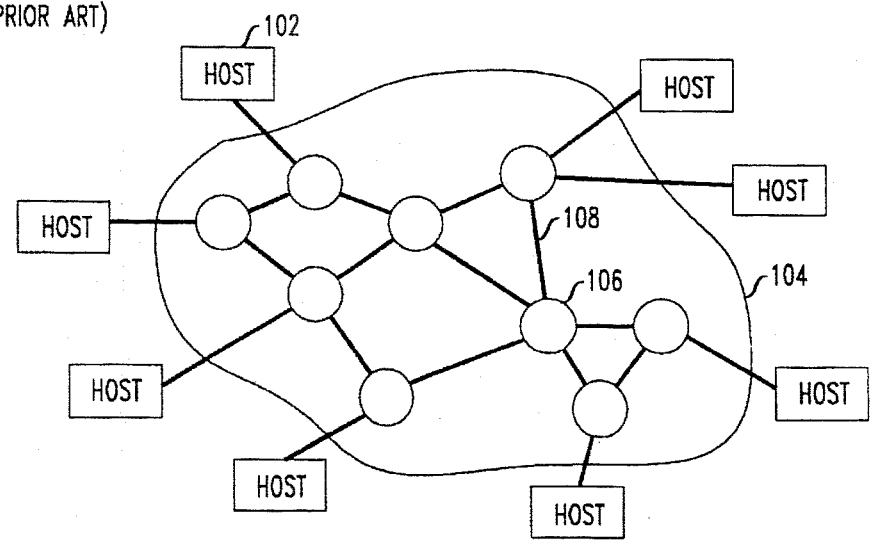
FIG. 1 illustrate s the structure of a computer network in which the inventive method is illustratively practiced.

FIG. 1 illustrates the structure of a typical computer network in which the inventive method may be practiced. Computer networks, i.e. interconnected collections of autonomous computers, provide a variety of services such as electronic mail and file transfer services. The first part of the network typically comprises a collection of machines 102, called hosts, intended for running application programs, and communications subnet 104 linking the hosts. The subnet's job is to transfer information from host to host. The subnet typically comprises two basic components: switching elements (also called nodes or interface message processors, IMPs) 106 and links (also called transmission lines) 108. Each host is connected to one, or occasionally several, IMPs.

Figure 2:
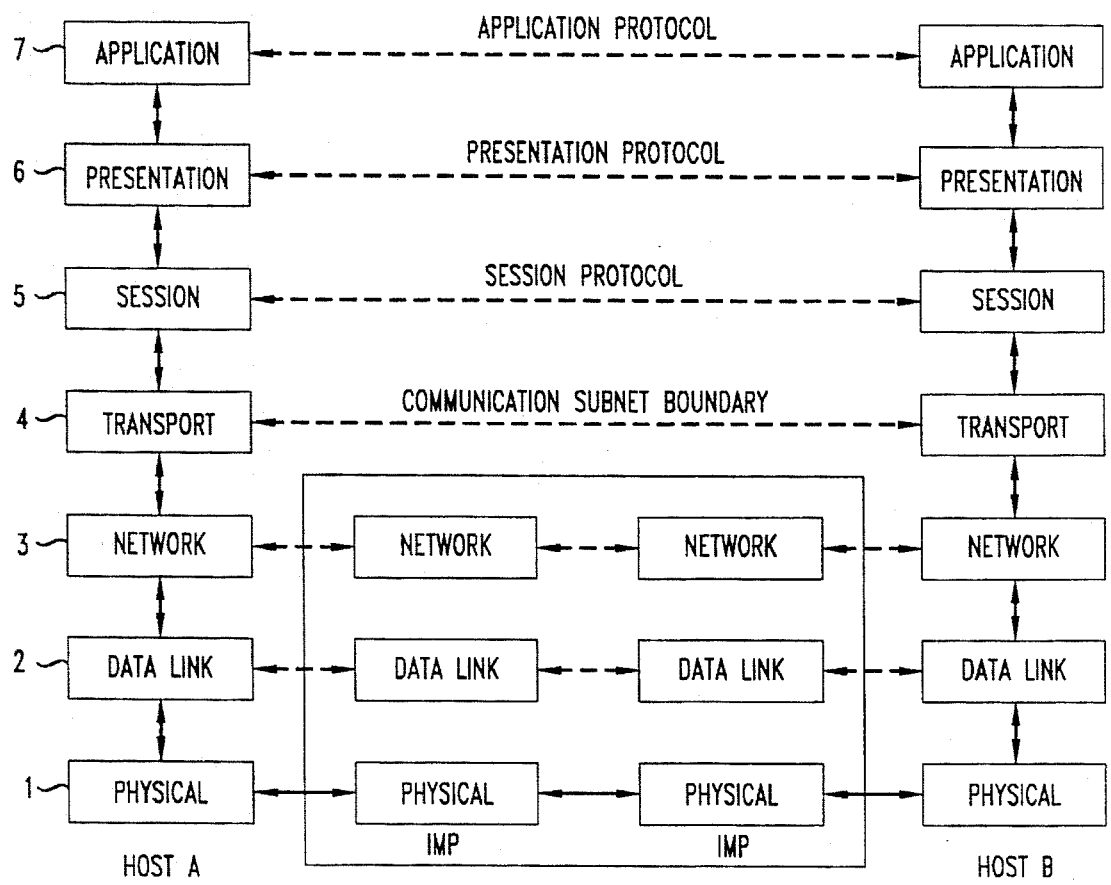
FIG. 2 is a block diagram of a network architecture based on the ISO model.

Computer networks are typically designed in a highly structured way. To reduce design complexity, most computer networks are organized as a series of layers. For example, the Reference Model of Open Systems Interconnection developed by the International Standards Organization (ISO) is a seven layer model. A network architecture based on this model is illustrated in FIG. 2. See, Tanenbaum, supra. The purpose of each layer is to offer services to higher layers, shielding those higher layers from the details of how the offered services are actually implemented. A service is formally specified by a set of primitives defining the operations that a layer provides to the layer above it. Adjacent layers communicate through an interface which defines the services the lower layer offers the higher layer.

The active elements in each layer are called entities. An entity may be a software entity (e.g. a process) or a hardware entity (e.g. an integrated circuit) or a combination of both. Entities in the same layer on different machines are called peer entities.

Each computer network has associated with it a well-defined "protocol" or set of rules to govern communication between peer entities. In particular, protocols are used to physically establish, execute and terminate communications between like or peer layers on the network so that offered services may advantageously be used. See, generally, Tanenbaum, supra; *Engineering and Operations in the Bell System,* Bell Laboratories, Inc., 1983. Communication between corresponding layers in different hosts is virtual in that only at the lowest layer is there a physical connection.

As noted above, communication subnet 104 (which, in the ISO model, comprises the three lowest layers) may be designed for point-to-point communications (i.e. communications between two hosts) or for broadcast communications. Recently however, multicast transmission (or simply "multicasting") among a subset of hosts in network has become increasingly important.

The following detailed description presents several embodiments of a multicast transport protocols, i.e. multicast protocols for the transport layer of the ISO model. The protocols are general in that they can be built on top of either virtual circuit networks or datagram networks. The protocols may advantageously be used in high speed, broadband networks such as asynchronous transfer mode (ATM) networks.

The function of the inventive protocols is to deliver packets of information from a source to destinations in sequence along a multicast tree, independent of how the tree is created and of how resources (e.g. bandwidth in the links) are allocated. Thus, the protocols are deployable in various networks and may advantageously use any resource allocation techniques in datagram networks or any techniques for setting up virtual circuits in connection-oriented networks.

The only service expected by the inventive method is the establishment of a multicast tree from the source to the destinations. A tree is characterized by a root and a set of intermediate nodes and links which end in a set of leaves. For example, in the network of FIG. 1, a point-to-multipoint multicast tree will have as its source one of the hosts, as its leaves a set of destination hosts, and as its intermediate nodes and links the IMPS and transmission lines connecting the root to the leaves. A multicast tree is not just a set of connecting nodes and links, but it also includes the computing and communication resources, such as bandwidth needed to guarantee a given quality of service, reserved along the intermediate nodes and links. The protocols described herein are independent of how the multicast tree is established, e.g. by using ST-2, RSVP or any connection-oriented protocol. See, C. Patridge and S. Pink, "An Implementation of the Revised Internet Stream Protocol (ST-2)", *Journal of Internetworking: Research and Experience,* Vol. 4, No. 1, March 1992; L. Zhang et al., "RSVP: A New Resource ReSerVation Protocol," *IEEE Network Magazine,* September 1993. As long as the multicast tree is provided, the protocols will operate.

Figure 3:
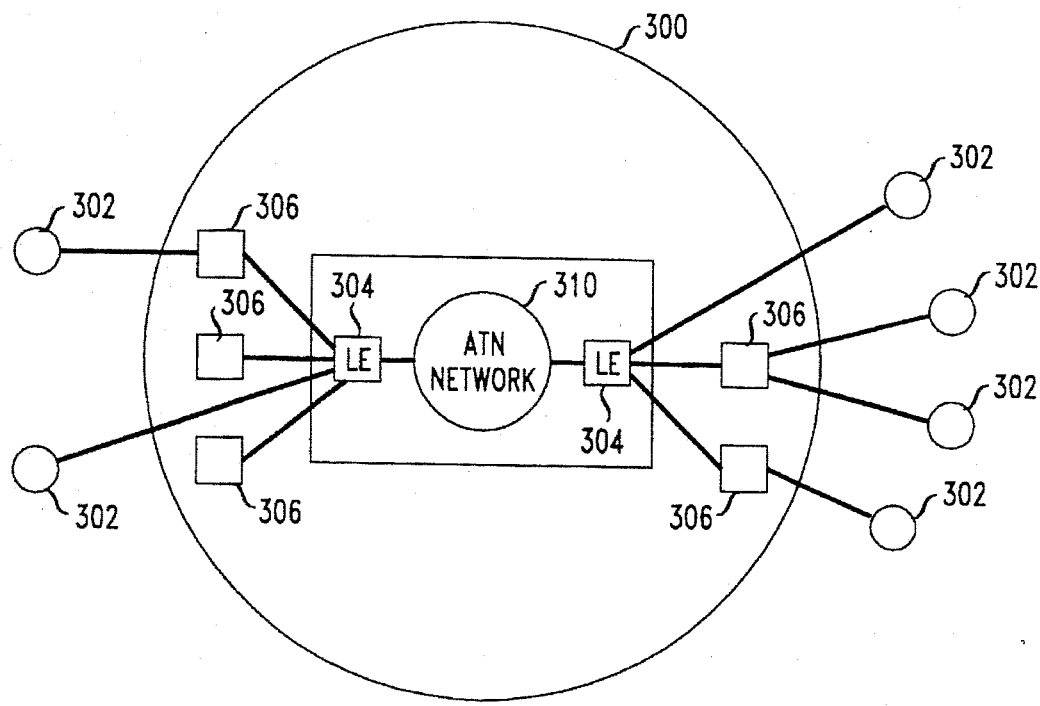
FIG. 3 illustrates the structure of a computer network in which the inventive method may be practiced.

The multicast protocols are advantageously illustrated in the context of network 300 of FIG. 3. Hosts 302 (also referred to as endpoints) are connected to local exchange (LE) 304 either directly or through access nodes 306. Note that the term local exchange is not limited to connection-oriented networks (e.g. the inventive method applies in the case where the local exchange is considered to be a router in a datagram network). The local exchanges are interconnected using backbone network 310, illustratively shown here as an ATM network. A hierarchical addressing scheme such as E.164, which is very similar to the current telephone numbering system, is assumed. That is, given the address of an endpoint, it is possible to infer the area to which the endpoint belongs. For example, if the address of an endpoint is 908-555-4567, it can be inferred that the endpoint is served by area code 908 and that the endpoint is located in New Jersey. All that is necessary is that the protocol have sufficient information to define destinations in a localized region as a group for purposes of retransmitting packets.

Figure 4:
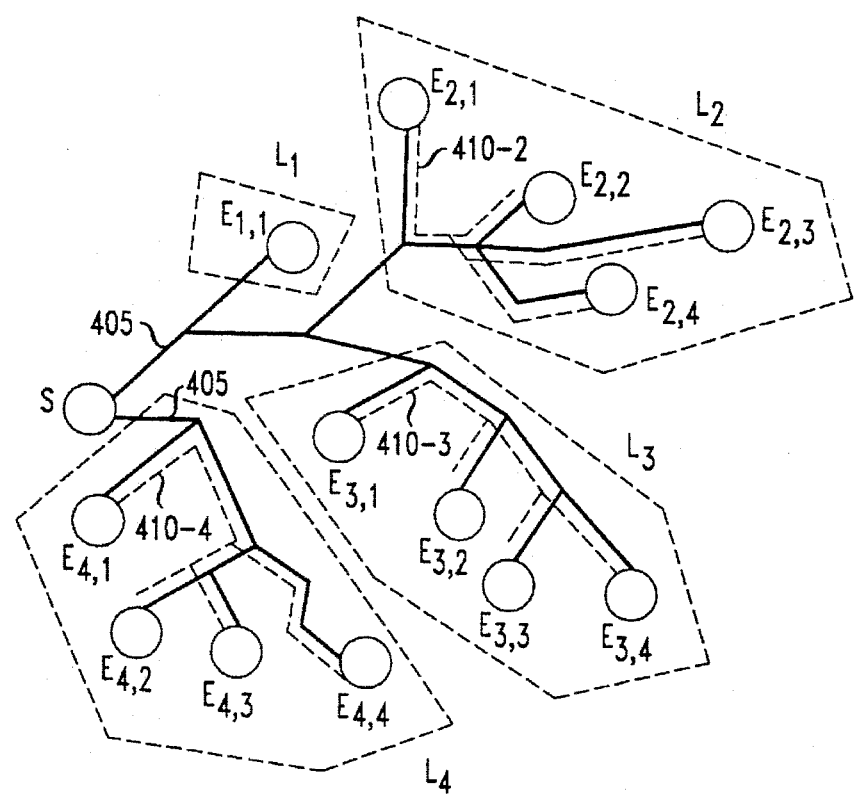
FIG. 4 illustrates a global multicast tree rooted at S and local multicast trees root at $E_{i,1}$.

As noted above, the protocols require a multicast tree. Assume that a multicast tree is set up with the allocation of resources at the network level in the ISO model (e.g. the ATM layer), rooted at a source host S and spanning all the destinations (i.e., the other hosts or endpoints). This is typically referred to as the global multicast tree to distinguish it from the local multicast tree. FIG. 4 illustrates the global multicast tree. The global multicast tree identifies multicast virtual circuit (MVC) 405 shown by bold lines. The endpoints in the local exchange $L_i$ are denoted by $E_{i,j}$. $L_i$ is not an endpoint. It is assumed that some estimate of round trip delay is available between S and each $E_{i,1}$ after the multicast tree is set up. The round trip delay corresponding to $E_{i,1}$ is referred to as $RTD_i$. The peak bandwidth, packet size, block size and re-ordering buffer size required at each destination are also set at the connection establishment time (i.e. the time at which network resources, such as bandwidth are reserved before transmission of data).

Note that several local multicast trees are formed based on the global multicast tree. A local multicast tree rooted at $E_{i,1}$ is the portion of the global multicast tree spanning the $E_{i,j}$'s in the $L_i$. Local multicast trees 410-i are shown by dashed lines in FIG. 4. Such a local multicast tree will be identified by a local multicast virtual circuit identifier, called an LMVCI. For illustrative purposes, only point-to-multipoint multicasting will be considered so that initially, there is a fixed source and a fixed set of endpoints. That is, there is a fixed single source and fixed multiple destinations case. It is shown later how to accommodate changing source and changing destinations as well as the multipoint-to-multipoint multicasting situation.

B. A First Embodiment—Designated Status Protocol (DSP)

In this section, a first embodiment of a multicast protocol, called the Designated Status Protocol (DSP), is described. In this protocol, the multicast tree is further characterized. The source picks an endpoint $E_{i,1}$, which can be thought of as the representative of the group of $E_{i,j}$'S, in each local exchange $L_i$. This $E_{i,1}$ is responsible for sending its own status to the source. Thus, if there are m LE's with final destinations (or endpoints), there will be m designated endpoints which are supposed to send their status to the source. In fact, the status sent by $E_{i,1}$ will show which blocks have been received by $E_{i,1}$, i.e. a status signal will be sent to the source indicating a reception status relative to the transmitted blocks. A block is a collection of packets, and it is the unit chosen for selective repeat retransmission as described below. However, the status typically will not indicate which blocks have been received by the $E_{i,j}$'s for $j \neq 1$. Each $E_{i,1}$ will be referred to as a local source (in contrast to the global source S).

Figure 5:
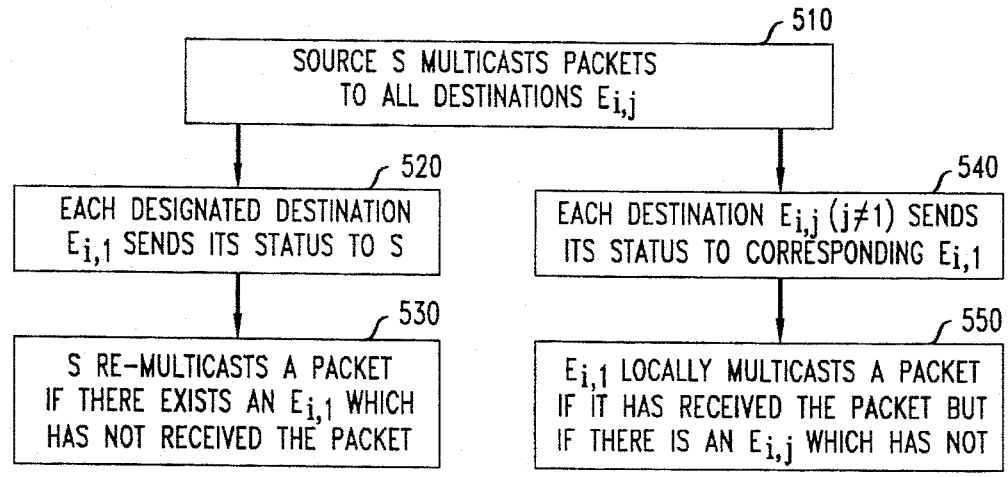
FIG. 5 is a diagram of steps in a first embodiment of the inventive method.

FIG. 5 is a diagram of the main steps in the DSP protocol. The protocol works as follows:

1. S multicasts data packets to all the destinations ($E_{i,j}$'s $\forall i,j$) using the global multicast tree in step 510. This multicast will be called a global multicast.

2. Each $E_{i,1}$ sends its own status to S in the form of control (status) packets at regular intervals in step 520. The status packet contains the information about which blocks have been received by $E_{i,1}$. S globally re-multicasts a block again in step 530 if there exists an $E_{i,1}$ which has not received the block within the expected time. This time duration is, in general, a multiple of the round-trip-delay between S and the $E_{i,1}$ in question.

3. Each $E_{i,j}$ ($j \neq 1$) sends its status to the corresponding $E_{i,1}$ at regular intervals in step 540. $E_{i,1}$ locally multicasts a block in step 550 if there exists an $E_{i,j}$ ($j \neq 1$) which has not received the block during global multicast. Note that an $E_{i,j}$ ($j \neq 1$) depends on the corresponding $E_{i,1}$ for the retransmission of a block if it did not receive the block either during the global multicast or during local multicasts.

4. S will multicast new blocks provided each $E_{i,1}$ has available buffer space for the new blocks. Note that an $E_{i,1}$ advantageously has two buffers: (1) a reassembly buffer which is used to assemble the packets it receives from S and (2) a retransmission buffer which is used to retain the packets (blocks) that have not been received by all the $E_{i,j}$'s in its jurisdiction (Note: $E_{i,j}$'s served by an $L_i$ are said to be in the same jurisdiction.) A block is transferred from the reassembly buffer to the retransmission buffer when there is space in the retransmission buffer. This transfer creates space in the reassembly buffer of $E_{i,1}$. If, however, both buffers are full, there is no space for new blocks. The status of space available in the reassembly buffer is sent to S as a part of the status message from $E_{i,1}$ to S so that S knows if it can multicast a new block.

A slightly modified version of the protocol can also be considered in which the source multicasts to all the representatives $E_{i,1}$'s (instead of to all the $E_{i,j}$'s for all i,j) and the $E_{i,1}$'s multicast to the $E_{i,j}$'s ($j \neq 1$), thereby dividing the connection along each source/destination pair into two segments: one from the source to $E_{i,1}$ and the other from the $E_{i,1}$ to $E_{i,j}$ ($j \neq 1$).

The following paragraphs describe the DSP protocol in greater detail by describing the format of control and data packets and by describing the data structure used by the entities of the DSP.

Figure 6:
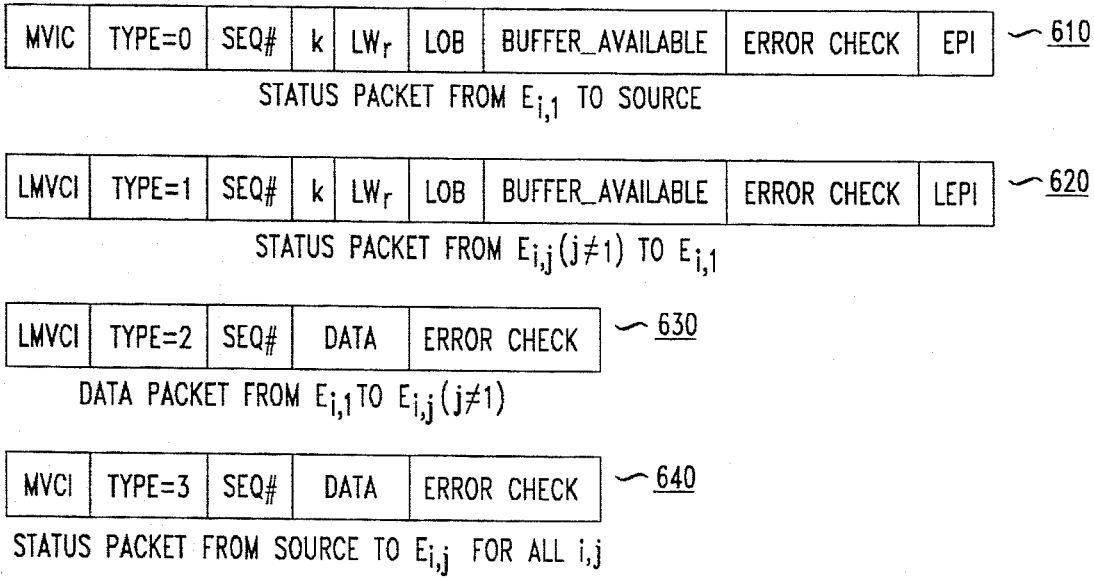
FIG. 6 illustrates packet formats for the first embodiment of the inventive method.

The following packet structures are advantageously used in the protocol and are illustrated in FIG. 6: control (status) packet 610 from an $E_{i,1}$ to the source; control (status) packet 620 from an $E_{i,j}$ ($j \neq 1$) to $E_{i,1}$; multicast data packet 630 from source S to $E_{i,j}$'s $\forall i, j$; and multicast data packet 640 from an $E_{i,1}$ to $E_{i,j}$ $\forall j$ ($j \neq 1$).

The notation given below is used to represent the fields of the control and data packets illustrated in FIG. 6. Note that MVCI (Multicast Virtual Circuit Identifier) is reminiscent of the VCI (Virtual Circuit Identifier) used in connection-oriented networks. However, MVCI, as used herein, is more general and simply identifies a specific multicast connection which may use a static allocation of resources at the connection establishment time or a dynamic allocation of resources as done by the RSVP protocol. See Zhang, supra.

TABLE 1

Explanation of Notation Used in Packet Formats

| Notation | Explanation |
| --- | --- |
| MVCI | a multicast virtual circuit identifier. |
| LMVCI | a local multicast virtual circuit identifier. |
| Type | Type of a packet.<br>Type = 0 indicates a status packet from $E_{i,1}$ to the source.<br>Type = 1 indicates a status packet from $E_{i,j}$ ($j \neq 1$) to $E_{i,1}$.<br>Type = 2 indicates a data packet from $E_{i,1}$ to $E_{i,j}$ ($j \neq 1$).<br>Type = 3 indicates a data packet from S to $E_{i,j}$ $\forall$ i,j. |
| Seq# | sequence number of a packet. It is incremented by sender each time a new packet is transmitted. |
| k | interval between two successive status packets in units of $T_{IN}$, where $T_{IN}$ = max(RTD/kou,ipt), kou is a constant between 2 and 32, and ipt is the interval between two successive packet transmissions. |
| $LW_r$ | lower end of window in receiver, that is, the maximum sequence number of the block below which every packet in every block has been correctly received as known at the receiver. In the context of the global multicast tree, $E_{i,1}$'s are treated as receivers. For local multicast trees, $E_{i,j}$'s ($j \neq 1$) are treated as receivers. |
| L | the largest allowed number of outstanding blocks chosen at the connection establishment time. An outstanding block is a block that has been multicast at least once but not yet been acknowledged by all the $E_{i,1}$'s. |
| LOB | list of outstanding blocks. A bit map representing the outstanding blocks between $LW_r$ and ($LW_r + L - 1$ |
| Buffer_available | an integer representing the space available in the reassembly buffer of an $E_{i,1}$ in terms of the number of blocks. |

TABLE 1-continued

Explanation of Notation Used in Packet Formats

| Notation | Explanation |
| --- | --- |
| EPI | an endpoint identifier which is used to identify an $E_{i,1}$. |
| LEPI | a local endpoint identifier which is used to identify an $E_{i,j}$ (j≠1). |

Table 1: Explanation of Notation Used in Packet Formats

The source S maintains a table T to keep track of the status of each multicast block. That is, T records which of the $E_{i,1}$'s have received and acknowledged a given block and if there is an $E_{i,1}$ which has not received a block within the expected time. An entry in T corresponds to a block which has been multicast. Each entry has an array of retransmission counts count[i] and an array of acknowledgements ack[i], where count[i] and ack[i] correspond to the retransmission count and acknowledgement status of $E_{i,1}$ respectively. An ack[i] is 1(0) if the corresponding block has (not) been received and acknowledged by $E_{i,1}$ to S. The retransmission count is advantageously set equal to $RTD_i/T_{IN,i}$+constant where $T_{IN,i}$=max($RTD_i$|kou,ipt) where kou is a constant between 2 and 32 and ipt is the interval between two successive packet transmissions. $RTD_i$ is the estimated round trip delay between S and $E_{i,1}$. Each time a status packet arrives from $E_{i,1}$, the count[i]'s and ack[i]'s are updated by S in the table T. In fact, count[i] is decremented by $k_i$ each time a status packet from $E_{i,1}$ arrives at the source S, where $k_i$ is the interval in units of $T_{IN,i}$ between two successive status packets of $E_{i,1}$.

In terms of the data structures used by the destinations, each destination maintains two tables: one corresponding to the blocks and the other corresponding to the packets within the blocks. The table corresponding to the blocks keeps track of which blocks have been received by the destination while the table corresponding to the packets keeps track of which packets within a block have been received by the destination. In fact, an entry corresponding to a block is updated in the first table based on the entries corresponding to the packets within the given block in the second table. For example, if all packets $p_{i,j}$ within a block $b_i$ are received at a destination, the entry corresponding to $b_i$ in the first table is marked as received by the destination. Otherwise, it is marked as not received by the destination. This information regarding $b_i$ is carried in the LOB part of the status messages.

Some additional data structures can be used by a load source $E_{i,1}$. Each $E_{i,1}$ maintains a table $T^{(i)}$ to keep track of the status of the blocks it has locally multicast. Thus $T^{(i)}$ helps $E_{i,1}$ to determine which blocks have been received by all the destinations in its jurisdiction and if there is a block which has not been received by a destination in its jurisdiction during the expected time. Each entry in $T^{(i)}$ corresponds to a block which has been locally multicast. $T^{(i)}$ is similar in structure to T. That is, an entry in $T^{(i)}$ has an array of retransmission counts count[j] and an array of acknowledgments ack[j] in which a count[j] and an ack[j] correspond, respectively, to the retransmission count and acknowledgement status of $E_{i,j}$ as known to $E_{i,1}$. Each time a status packet arrives from $E_{i,j}$, the count[j] and ack[j] are updated by $E_{i,1}$ in the table $T^{(i)}$. In fact, count[j] is decremented by $k_j$ each time a status packet from $E_{i,j}$ arrives at the local source $E_{i,1}$ where $k_j$ is the interval in units of $T_{IN,j}^{(i)}$ between two successive status packets of $E_{i,j}$. $T_{IN,j}^{(i)}$=max ($RTD_j^{(i)}$|kou, ipt) and $RTD_j^{(i)}$=round trip delay between $E_{i,1}$ and $E_{i,j}$.

With definitions of the format of data and control packets and with definitions of the data structures used by entities of the protocol, the steps in the first embodiment of the protocol (i.e. the DSP protocol) can be described in even more detail. In particular:

1. S multicasts packets to all the destinations ($E_{i,j}$'s ∀i,j) using the multicast tree and updates the table T. It sets count[i] to $k_i$ and ack[i] to 0 for each block $b_i$.
2. Each $E_{i,1}$ sends its status to S in the form of control (status) packets at regular intervals ($k_i$ denotes the interval in terms of $T_{IN,i}$ in the status packet). S re-multicasts a block if there exists an i such that retransmission count count[i] corresponding to the block is reduced to zero but ack[i] corresponding to the block is not 1. That is, a block is re-multicast provided there is an $E_{i,1}$ that has not received the block within the time it was supposed to have.
3. Each $E_{i,j}$ sends its status to the corresponding $E_{i,1}$ at regular intervals. $E_{i,1}$ which initializes count[j] and ack[j] to $k_j$ and to 0 respectively, multicasts a block if there exists a j such that count[j]=0 and ack[j]=0 in the table $T^{(i)}$. That is, a block is locally multicast by $E_{i,1}$ if there is an $E_{i,j}$ that has not received the block.
4. S will multicast a new block provided buffer_available$_i$>0∀i. That is, buffer space is available at each $E_{i,1}$ for new packets. Note that an $E_{i,1}$ may indicate that buffer_available$_i$=0 if it cannot remove old blocks from its retransmission buffer because some local destinations $E_{i,j}$'s have not yet acknowledged the receipt of those blocks. In this way, an $E_{i,1}$ may prevent the source S from flooding the network with new multicast blocks.

The inventive DSP protocol has several advantages. First, acknowledgment traffic to the source is considerably reduced compared to schemes in which every destination individually acknowledges the receipt of a packet/block to the multicasting source. This is because not all the destinations (endpoints) send acknowledgment (status) packets to the source S in the inventive protocol. Only the $E_{i,1}$'s send status packets to the source S. Second, by reason of local multicasting, retransmission traffic due to redundant global remulticasts is considerably reduced as is the data latency this protocol has many of the advantages of the SNR protocol. See, A. N. Netravali et al., "Design and Implementation of a High Speed Transport Protocol," *IEEE Trans. Comm.*, Vol. 38, No. 11, November 1990. As in the SNR protocol, the periodic exchange of complete state information (i.e. the $LW_r$, LOB and buffer_available information) in the DSP protocol makes error recovery simpler in this scheme as compared to schemes which do not exchange complete state information periodically. Third, the global multicast tree and the local multicast trees are set up at the connection establishment time and hence the data transfer phase is less time consuming in this scheme as compared to a scheme in which the multicast trees are set up dynamically. Fourth, if a block does not reach one of the $E_{i,1}$'s, it is multicast as soon as the source detects the loss of the block. Thus if a block is not received by more than one $E_{i,1}$, then S detects it from the "nearest" $E_{i,1}$ that has not received the block and does not wait for the acknowledgment of the other $E_{i,1}$'s that also have not received it. Therefore, recovery starts as early as possible. Fifth, it may also be possible to selectively re-transmit a block and reduce the retransmission traffic if two levels of VCI's are available: point-to-multipoint and point-to-point.

However, it should be noted that the $E_{i,1}$'s have to maintain a retransmission buffer so that they can re-transmit the blocks locally to the endpoints $E_{i,j}$'s that have not received the blocks. Also, an endpoint $E_{i,1}$ has to take the responsibility of multicasting some blocks even if it is simply a passive endpoint interested only in receiving multicast messages, and finally, since the $E_{i,1}$'s are selected at the connection establishment time, it may so happen that in a particular local exchange $L_i$, $E_{i,1}$ does not receive a block but some other $E_{i,j}$ receives it. In that case, S has to re-multicast the block even though some $E_{i,j}$ has received it in the jurisdiction of $E_{i,1}$. This problem could be overcome if the $E_{i,j}$ that received the block is chosen to be the $E_{i,1}$. However, if the $E_{i,1}$ is chosen dynamically, the local multicast tree needs to be built every time a block is transmitted which is a time consuming procedure.

Note also that, in order to detect connection failures, it may be necessary for $E_{i,1}$'s to know the status of S and for the $E_{i,j}$'s to know the status of corresponding $E_{i,1}$'s. In that case, a control packet for S can be introduced which will be periodically sent to $E_{i,1}$'s in the same manner as in SNR protocol. Similarly, $E_{i,1}$ must send its status to $E_{i,j}$'s at regular intervals.

The protocol described here is for a single source and multiple destinations. In case of multiple sources and multiple destinations, several multicast trees need to be set up, one rooted at each possible source. That will allow concurrent multipoint-to-multipoint multicasting. In order to prevent overbooking of resources along common branches of various multicast trees, resource allocation techniques like RSVP can be used in a connectionless network.

B. A Second Embodiment—Consolidated Status Protocol (CSP)

In DSP, an $E_{i,1}$ is chosen at each $L_i$ and that designated endpoint sends its own status message to the source S. In a second embodiment of the inventive method, termed the Consolidated Status Protocol (CSP), a status message is sent to the source by each local exchange $L_i$ and this status message is a consolidated status message of all the endpoints/destinations in its jurisdiction.

Figure 7:
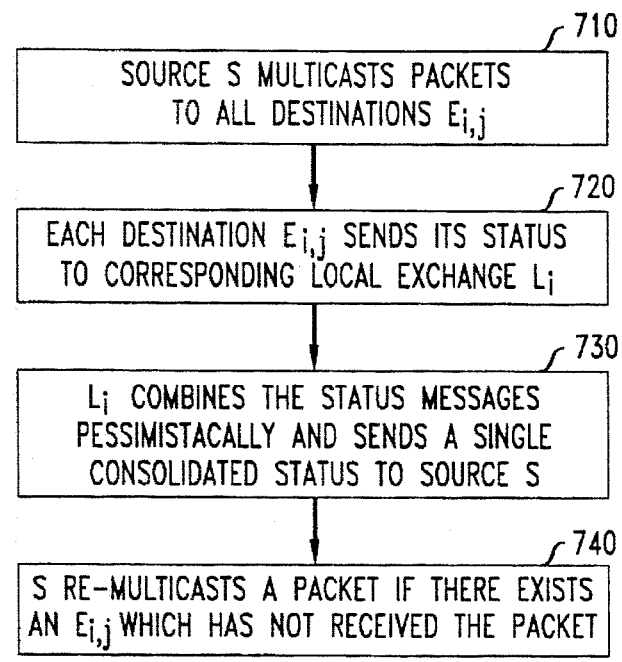
FIG. 7 is a diagram of steps in a second embodiment of the inventive method.

FIG. 7 is a diagram of the main steps in the CSP protocol. The protocol works as follows:

1. S multicasts a block to all the destinations $E_{i,j}$'s $\forall i,j$ in step 710 using the multicast tree which is set up at the connection establishment phase.
2. The $E_{i,j}$'s send their status at regular intervals to the corresponding local exchange $L_i$ in step 720. The format of the status message is the same as that of the status message 620 sent by $E_{i,j}$'s (for $j \neq 1$) to $E_{i,1}$ in DSP.
3. $L_i$ consolidates the status messages from the $E_{i,j}$'s in its jurisdiction. Periodically, $L_i$ sends its consolidated status to S in step 730, i.e. a status signal will be sent to the source indicating a reception status relative to the transmitted blocks. The following paragraphs describe a preferred method in which $L_i$ prepares a consolidated $LW_r$, a consolidated LOB and a consolidated buffer_available fields for the consolidated status message from the corresponding fields of individual status messages of $E_{i,j}$'s. Recall that the $LW_r$, LOB and buffer_available fields are defined in Table 1.

The consolidated $LW_r$ is formed as follows:

$LW_{r(consolidated)} = \min(LW_r^{(j)})$ where $LW_r^{(j)}$ is the $LW_r$ field of the status message of $E_{i,j}$ to $L_i$. That is, $L_i$ chooses the lowest value of $LW_r$ among the $LW_r$'s of the $E_{i,j}$'s status messages as the $LW_{r(consolidated)}$. For example, if the $LW_r$'s of the $E_{i,j}$'s are 4, 3, 2, 8 and 5, the $L_i$ will choose 2 as $LW_{r(consolidated)}$ indicating to S that all the destinations in its jurisdiction have received all the blocks up to block number 2, although there are some destinations in the same jurisdiction which have received all the blocks up to block numbers 3, 4, 5 and 8.

The consolidated LOB is formed as follows: the $LOB_{consolidated}$ is a bitwise AND of the properly aligned LOB's of the $E_{i,j}$'s. Note that the LOB field has a different meaning for the different $E_{i,j}$'s depending upon the value of $LW_r$. For example, if the $LW_r$ of $E_{i,2}$ is 3 and LOB is 01000010 (the leftmost bit in LOB corresponds to the lower end of the window and the rightmost bit corresponds to the upper end of the window), it means that $E_{i,2}$ has received all the blocks up to block number 3 and it has also received blocks 5 and 10. If $E_{i,4}$ has $LW_r=4$ and the same LOB, it means that $E_{i,4}$ has received all the blocks up to block number 4 and it has also received blocks 6 and 11. Therefore, if we want to consolidate the LOB's of $E_{i,2}$ and that of $E_{i,4}$, we must right shift the LOB of $E_{i,4}$ by one bit filling the leftmost bit of the LOB with 1 and discarding the rightmost bit of the original LOB, thus aligning the bits representing the status of the blocks 3, 4, 5, 6, 7, 8, 9 and 10. After the alignment is done, a bitwise AND operation must be done to find the consolidated LOB.

The buffer_available field in the consolidated status of $L_i$ is the minimum of the buffer_available values at the $E_{i,j}$'s in its jurisdiction.

$L_i$ sends the consolidated status of the destinations in its jurisdiction to S. The format of this status message is advantageously the same as that of the status message sent to S by the $E_{i,1}$'s in DSP.

4. S re-multicasts a block in step 740 to all the destinations if there exists an $E_{i,j}$ that has not received the block within the expected time. However, S could retransmit the block only to the specific $E_{i,j}$, who has not received the block, provided point-to-point connections were available in addition to the point-to-multipoint connections.
5. S multicasts a new block provided buffer space is available in each $L_i$ for receiving a new block. Here, if every endpoint $E_{i,j}$ in the local exchange $L_i$ has buffer available for a new block, it is said that the $L_i$ has buffer space available for a new block. Note that this protocol avoids using the $L_i$'s as store and forward nodes because the assembly of packets at the $L_i$'s will introduce unnecessary delay any unnecessary complexity at the switches.

CSP is generally very straightforward and has several advantages. For example, there are no local multicast trees as in DSP and hence all the re-multicasts are done by the source S. Also, the acknowledgement (status message) traffic to the source S is considerably less compared to the scheme in which every destination individually acknowledges the receipt of a block to the source. Further, no destination requires a retransmission buffer as in DSP. Finally, if a block does not reach one of the $E_{i,j}$'s, then it is multicast as soon as S detects the loss of the block. Thus if a block is not received by more than one $E_{i,j}$, then S detects it from the "nearest" $L_i$ that has not received the block and does not wait for the acknowledgment of the other $L_i$'s that also have not received it. Therefore, recovery starts as early as possible. Note, however, that each $L_i$ has to consolidate the status of the $E_{i,j}$'s in its jurisdiction. This is an additional burden on the $L_i$'s and requires changes to switches, rather than endpoints. Also, if there is a single $E_{i,j}$ that has not received a block, S has to multicast the block to all the destinations whereas in DSP, such a case is handled by a local multicast by the corresponding $E_{i,1}$.

D. A Third Protocol—Combined Protocol (CP)

A third embodiment of the inventive method, termed the Combined Protocol (CP), combines ideas from DSP and CSP. The local multicast trees in DSP are set up at the connection establishment time and hence the $E_{i,1}$'s remain unchanged during the entire multicast from S. However, this may lead to a situation in which an $E_{i,1}$ has not received a block but some other $E_{i,j}$ in the same jurisdiction (that is, within the same $L_i$) has received that block. In such a situation, S will re-multicast the packet in DSP.

Figure 8:
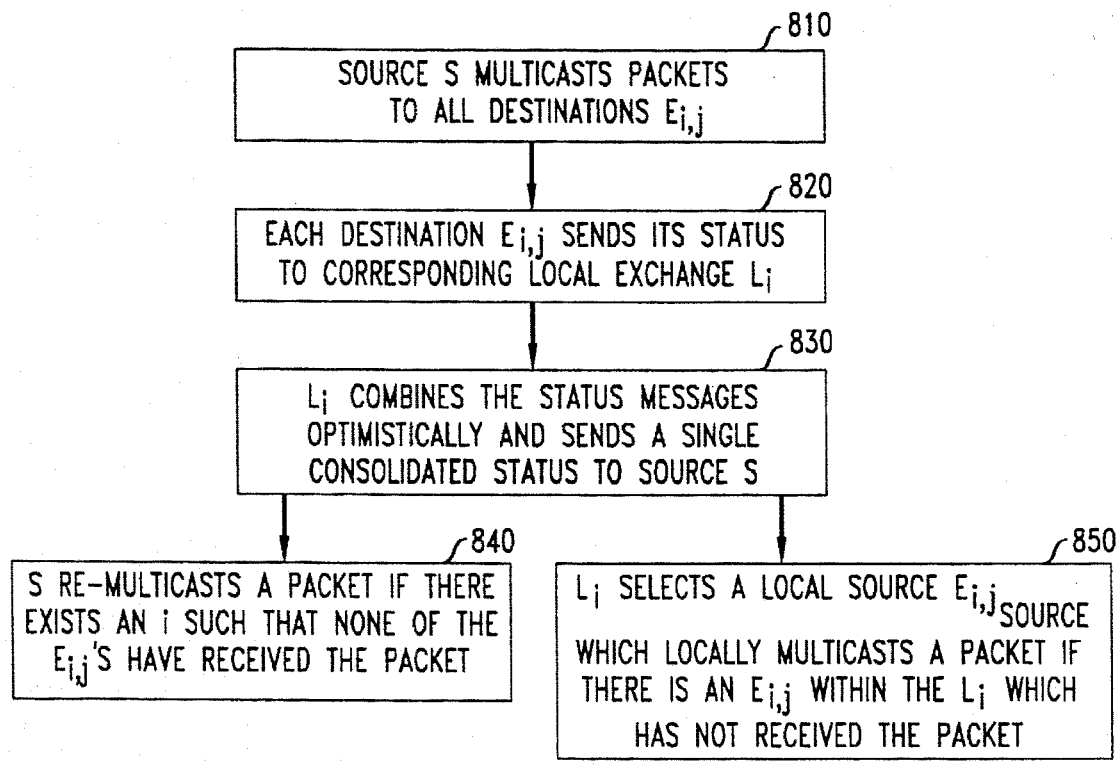
FIG. 8 is a diagram of steps in a third embodiment of the inventive method.

CP, however, is an attempt to remedy the above situation by dynamically choosing the local multicast trees. FIG. 8 is a diagram of the main steps in the CP protocol. The protocol works as follows:

1. S multicasts a block to all the destinations in step 810 using the global multicast tree that is chosen at the connection establishment time.
2. The endpoints $E_{i,j}$'s send their status to the corresponding local exchange $L_i$ exactly as in CSP in step 820. $L_i$ sends a consolidated status to the source S indicating a reception status relative to the transmitted blocks. However, the consolidation of status is done differently in CP than in CSP.

The following paragraphs describe how $L_i$ prepares a consolidated $LW_r$, a consolidated LOB and a consolidated buffer_available from the corresponding fields of individual status messages of $E_{i,j}$'s for the CP protocol.

The consolidated $LW_r$ is formed as follows:

$LW_{r(consolidated)} = \max (LW_r^{(j)})$ where $LW_r^{(j)}$ is the $LW_r$ field of the status message of $E_{i,j}$ to $L_i$. That is, $L_i$ chooses the highest value of $LW_r$ among the $LW_r$'s of the $E_{i,j}$'s status messages as the $LW_{r(consolidated)}$. For example, if the $LW_r$'s of the $E_{i,j}$'s are 4, 3, 2, 8 and 5, the $L_i$ will choose 8 as its $LW_r$ indicating to S the presence of a destination in its jurisdiction that has received all the blocks up to block number 8, although there are other destinations in the same jurisdiction that have not received all the blocks up to block number 8. In some sense, CP is an optimistic protocol in contrast to CSP which is pessimistic.

$LOB_{consolidated}$ is a bitwise OR of the properly aligned LOB's of the $E_{i,j}$'s. Suppose that the $LW_r$ of $E_{i,2}$ is 3 and LOB is 01000010, and the $LW_r$ of $E_{i,4}$ is 4 and the LOB is the same. Consolidation in CP is done in the following way. The LOB of $E_{i,2}$ is left shifted by one bit filling the rightmost bit of the LOB with 0 and discarding the leftmost bit of the original LOB, thus aligning the bits representing the status of the blocks 4, 5, 6, 7, 8, 9, 10 and 11. After the alignment is done, a bitwise OR operation must be done to find the consolidated LOB.

The buffer_available field in the consolidated status of $L_i$ is the minimum of the buffer_available at the $E_{i,j}$'s in its jurisdiction.

3. $L_i$ sends the consolidated status of the destinations in its jurisdiction to S in step 830. The format of this status message is advantageously the same as that of the status message sent to S by the $E_{i,1}$'s in DSP.

Since the $L_i$ has the global status of the destinations in its jurisdiction, it knows which blocks have been received by which endpoints and which blocks have not been received by all the destinations in its jurisdiction. Based on this information, the $L_i$ creates a local multicast tree rooted at the $E_{i,j}$ which has received a given block not received by every destination in the $L_i$. Refer to that particular $E_{i,j}$ as $E_{i,jsource}$.

4. $L_i$ informs the $E_{i,jsource}$ about the block(s) it needs to multicast locally to the destinations in $L_i$. $E_{i,jsource}$ multicasts repeatedly to the $E_{i,j}$'s until told to stop by $L_i$ which has the aggregate status of the $E_{i,j}$'s in its jurisdiction.

In fact, the destination $E_{i,j}$'s keep sending their status to $L_i$ and not to the $E_{i,jsource}$. $L_i$ collects the status of the destinations in its jurisdiction and creates a local multicast tree dynamically. This is step 850.

5. S re-multicasts a block if some $L_i$ has not received the block in step 840. Here, if no $E_{i,j}$ within an $L_i$ has received a given block, then the $L_i$ has not received the block.
6. S multicasts a new block if each $L_i$ has buffer space available for new blocks. In this context, if buffer_available>0 for each $E_{i,j}$ in an $L_i$, then buffer space is available for the $L_i$.

Among the protocols described, the re-multicasting traffic from the source S to the destinations is typically the least in CP. This is true because S need not re-multicast a block once at least a single destination in each $L_i$ receives the block. CP is advantageous in that acknowledgment traffic to the source is considerably reduced compared to the scheme in which every destination individually acknowledges the receipt of a packet/block to the multicasting source, because not all the destinations (endpoints) send acknowledgment (status) packets to the source S. Only the $L_i$'s send status packets to the source S. CP also retains all the advantages of the SNR protocol. The periodic exchange of complete state information makes error recovery simpler in this protocol as compared to other protocols that do not exchange complete state information periodically. Note also that if a block does not reach one of the $L_i$'s, it is multicast as soon as S detects the loss of the block. Here, if a block does not reach any destination $E_{i,j}$ within the local exchange $L_i$, then the block is not received by the $L_i$. Thus, if a block is not received by more than one $L_i$, then S detects it from the "nearest" $L_i$ that has not received the block and does not wait for the acknowledgment of the other $E_{i,1}$'s that also have not received it. Therefore, recovery starts as early as possible.

CP has a processing overhead associated with dynamically setting up the local multicast trees as opposed to statically setting them up during connection establishment as in DSP. There is also a communication overhead because each $L_i$ has to inform the corresponding $E_{i,j\ source}$ of the packet the locally and also to inform the $E_{i,j\ source}$ when it does not need to multicast any more. Note further that CP requires that all the endpoints $E_{i,j}$'s have to maintain two buffers; (1) a reassembly buffer and (2) a retransmission buffer. The need for the first one is obvious. The retransmission buffer needs to be maintained because an $E_{i,j}$ may have to re-transmit the blocks locally to other $E_{i,j}$'s that have not received them. Finally, every endpoint $E_{i,j}$ may have to bear the responsibility of re-transmitting some blocks even if it is simply a passive endpoint interested only in receiving multicast messages.

E. Conclusion

This disclosure describes a method of network multicasting. The method has been described without reference to specific hardware or software. Instead, the method has been described in such a way that those skilled in the an can readily adapt hardware or software as may be available or preferable. While the above teaching of the present invention has been in terms of multicast protocols of those skilled in the art will recognize the applicability of these teachings to other contexts.

We claim:

1. A method comprising the steps of:

transmitting blocks of information from a source to a set of destinations, wherein each destination is assigned to one local exchange in a set of local exchanges receiving at said source a first status signal from each local exchange, said first status signal indicating a reception status for one or more destinations assigned to that local exchange relative to the transmitted blocks, wherein each destination has an associated set of buffers and wherein said first status signal from each local exchange indicates the space available in the buffers of at least one destination in that local exchange; and transmitting, from said source to destinations assigned to said local exchanges in response to said first status signals, those blocks of information not received by one or more destinations assigned to said local exchanges.

2. A method comprising the steps of:

transmitting block of information from a source to a set of destinations, wherein each destination is assigned to one local exchange in a set of local exchanges;

receiving at said source a first status signal from each local exchange, said first status signal indicating a reception status for that local exchange relative to the transmitted blocks, wherein said first status signal from each local exchange is sent by a representative destination in each local exchange and wherein said first status signal indicates a set of particular blocks of information not received by said designated representative; and transmitting, from said source to said local exchanges in response to said first status signals, those blocks of information not received by the representative in said local exchanges.

3. The method of claim 2 further comprising the step of:

sending a respective second status signal from each destination in each local exchange to the representative for that local exchange, wherein said respective second status signal from each destination indicates a set of blocks of information not been received by that destination.

4. The method of claim 3 further comprising the step of:

transmitting, along a local multicast tree within each local exchange, a subset of the sets of blocks of information not received by destinations within that local exchange wherein the root of the local multicast tree in each local exchange is the respective representative destination for that local exchange.

5. A method comprising the steps of:

transmitting blocks of information from a source to a set of destinations, wherein each destination is assigned to one local exchange in a set of local exchanges;

receiving at said source a first status signal from each local exchange, said first status signal indicating a reception status for that local exchange relative to the transmitted blocks, wherein the respective first status signal from each local exchange is based on a respective second status signal from each destination in that local exchange, wherein the respective second status signal from each destination indicates a set of blocks of information not received by that destination; and transmitting, from said source to said local exchanges in response to said first status signals, those blocks of information not received by one or more destinations assigned to said local exchanges.

6. A method of transmitting information from a source to each destination in a set of destinations along a global multicast tree, wherein each destination in said set of destinations is assigned to a local exchange in a set of local exchanges and wherein a particular destination in each local exchange is a representative for that local exchange, the method comprising the steps of:

transmitting blocks of information to each destination in said set of destinations along said global multicast tree;

sending a respective first status signal to said source from each representative, wherein the respective first status signal from each representative indicates a set of particular blocks of information have not been received by that representative;

retransmitting from said source along said global multicast tree the sets of particular blocks of information not received by one or more representatives;

sending a respective second status signal from each destination in each local exchange to the representative for that local exchange, wherein the respective second status signal from each destination indicates a set of blocks of information have not been received by that destination; and retransmitting from each representative in a local exchange to the destinations in that local exchange the sets of blocks of information not received by one or more destinations in that local exchange.

7. The method of claim 6 wherein each representative has a set of associated buffers and wherein said information is stored in said buffers.

8. The method of claim 7 wherein said first status signal from a given representative indicates whether said representative has sufficient space in the associated buffer to receive new blocks of information.

9. The method of claim 6 wherein said global multicast tree is established at a transport level in a computer network.

10. A method of transmitting information from a source to each destination in a set of destinations along a global multicast tree, wherein each destination in said set of destinations is assigned to a local exchange in a set of local exchanges, the method comprising the steps of:

transmitting blocks of information to each destination in said set of destinations along said global multicast tree;

sending a respective first status signal from each destination in a local exchange to that local exchange, wherein the respective first status signal from each destination indicates a set of blocks of information not received by that destination in that local exchange; and sending a respective consolidated status signal from each local exchange to said source, wherein the respective consolidated status signal from each local exchange is based on first status signals received from destinations in that local exchange and wherein the consolidated status signal from each local exchange indicates the sets of blocks of information not been received by destinations in that local exchange.

11. The method of claim 10 further comprising the step of:

retransmitting along said global multicast tree the sets of blocks of information not received by one or more destinations.

12. The method of claim 10 further comprising the step of:

retransmitting, from said source to a given destination along an available point-to-point connection, the set of blocks not received by the given destination.

13. A method of transmitting information from a source to each destination in a set of destinations along a global multicast tree, wherein each destination in said set of destinations is assigned to a local exchange in a set of local exchanges, the method comprising the steps of:

transmitting blocks of information to each destination in said set of destinations along said global multicast tree;

sending a respective first status signal from each destination in a local exchange to that local exchange, wherein each respective first status signal indicates a set of blocks of information not received by that destination in that local exchange; and sending a respective consolidated status signal from each local exchange to said source wherein each respective consolidated status signal is based on the respective first status signals received from destinations in that local exchange;

if said respective consolidated status signal indicates that no destinations within a local exchange have received a given block of information, then retransmitting from said source said given block along said multicast tree; and in each local exchange:

generating, based on the respective first status signals received from destinations in the local exchange, a local multicast tree rooted at a destination in the local exchange which has received a particular block of information not received by every destination in the local exchange, and transmitting said particular block of information along said local multicast tree until said respective first status signals indicate said particular block has been received by every destination in the local exchange.

* * * * *